United States Patent [19]

Neukam

[11] Patent Number: 5,370,496

[45] Date of Patent: Dec. 6, 1994

[54] DISCHARGE UNIT

[75] Inventor: Helmut Neukam, Hausmannstätten, Austria

[73] Assignee: P.E.E.M. Förderanlagen Ges. m.b.H., Graz, Austria

[21] Appl. No.: 139,394

[22] Filed: Oct. 18, 1993

[30] Foreign Application Priority Data

Nov. 16, 1992 [AT] Austria .................. 2264/92

[51] Int. Cl.$^5$ ............................ B65G 59/06
[52] U.S. Cl. ........................ 414/798.1; 221/274
[58] Field of Search ............ 414/798, 798.1; 221/223, 230, 232, 238, 251, 274

[56] References Cited

U.S. PATENT DOCUMENTS

| 2,674,976 | 4/1954 | Roach | 414/798 X |
| 3,342,350 | 9/1967 | Seragnoli | 414/798.1 X |
| 4,551,052 | 11/1985 | Pattarozzi | 414/794 X |

FOREIGN PATENT DOCUMENTS

| 260267 | 9/1988 | German Dem. Rep. . | |
| 1813680 | 7/1969 | Germany | 414/798 |
| 4-133909 | 5/1992 | Japan | 414/798.1 |
| 4-159924 | 6/1992 | Japan | 414/798.1 |
| 654274 | 2/1986 | Switzerland . | |

Primary Examiner—Frank E. Werner
Assistant Examiner—Janice L. Krizek
Attorney, Agent, or Firm—Collard & Roe

[57] ABSTRACT

A discharge unit for sequentially discharging a lowermost piece of a stack of said pieces superposed in a shaft. The pieces in the stack have the same dimension as the inner cross section of the shaft and the shaft has a lower end wherefrom the lowermost pieces are sequentially discharged. The lower shaft end defines a plane and an axle extends in this plane. A bell crank lever having a first arm and a second arm is supported on the axle for pivoting between a first position wherein the first arm projects into the inner cross section of the shaft to hold the lowermost piece in the shaft and a second position wherein the first arm is retracted out of the inner shaft cross section to release the lowermost piece for discharge from the shaft. The second bell crank lever arm is arranged to clamp the piece of the stack superposed over the lowermost piece in position when the first bell crank lever arm is pivoted into the second position to hold the stack in the shaft.

4 Claims, 2 Drawing Sheets

DISCHARGE UNIT

BACKGROUND OF THE INVENTION

1. Field of the Invention

The present invention relates to a discharge unit for sequentially discharging a lowermost piece of a stack of these pieces superposed in a shaft, the pieces in the stack having a predetermined dimension and the shaft having an inner cross section corresponding to this dimension and a lower end wherefrom the lowermost pices are sequentially discharged, the lower shaft and defining a plane. The discharge unit comprises an axle extending in this plane, a bell crank lever having a first arm and a second arm, the bell crank lever being supported on the axle for pivoting between a first position wherein the first arm projects into the inner cross section of the shaft to hold the lowermost piece in the shaft and a second position wherein the first arm is retracted out of the inner shaft cross section to release the lowermost piece for discharge therefrom from the shaft, and a clamping device arranged to be movable relative to the shaft to clamp the piece superposed over the lowermost piece in position to hold the stack in the shaft.

2. Description of the Prior Art

Such a discharge unit has been disclosed, for example in Swiss patent No. 654,274. According to this patent, the clamping device is constituted by a pair of clamping bell crank levers, a side of one of whose arms facing the piece superposed over the lowermost piece of the stack to be discharged is engageable therewith. This pair of clamping bell crank levers is controlled in unison with a pair of bell crank levers having an arm projecting into the inner cross section of the shaft in a locking position wherein these arms support the stack of pieces in the shaft. One of the bell crank levers of each pair are pivotally arranged on a common axle, all the levers are biased against assuming their respective clamping and locking positions and rotating cams control their pivoting movements.

This structure has the disadvantage of considerable structural complexity. Furthermore, the control cams require relatively much space adjacent the shaft holding the stack, which imparts considerable width to the unit.

German Democratic Republic patent No. 260,267 discloses a discharge unit for sequentially discharging a lowermost piece of a stack of these pieces superposed in a shaft from a lower shaft end, which comprises two plates movable perpendicularly to the shaft at the shaft end. A lower one of the plates projects into the inner cross section of the shaft in a locking position and an upper one of the plates has a side engageable with the stack to clamp it in position. The two plates are coupled together by two bell crank levers and are alternately movable in opposite directions perpendicularly to the longitudinal axis of the shaft. This structure too, requires considerable space adjacent the shaft.

SUMMARY OF THE INVENTION

It is the primary object of this invention to improve a discharge unit of the first-described type by avoiding its disadvantages and providing a simple and space-saving structure.

This and other objects are accomplished by the invention by using the second bell crank lever arm as the clamping device, the second bell crank lever arm being arranged to clamp the piece of the stack superposed over the lowermost piece in position when the first bell crank lever arm is pivoted into the second position to hold the stack in the shaft.

This structure assures a dependable discharge of the lowermost piece of the stack from the lower end of the shaft while only enough space is required laterally adjacent the shaft to permit the bell crank lever to pivot between its first and second positions. Particularly for discharge units for flat pieces of goods of an area of a size of CDs or cassettes, for example, this unused space between adjacent shafts is considerably smaller than in conventional discharge units. The structure also is considerably simpler than that of conventional units.

According to a preferred feature of the present invention, a layer of an elastically deformable material mounted on the second bell crank lever arm facing the superposed piece, the first arm being spaced from a lower edge of the elastically deformable material by a distance corresponding to the height of the lowermost piece. The elastically deformable material preferably has a great friction coefficient. This assures a secure clamping of the stack in the release position of the first bell crank lever arm, the elasticity of the material permitting relatively large tolerances which are absorbed by the elastic deformation of the material.

According to another preferred feature, the discharge unit comprises two such axles extending parallel to each other in the plane at opposite sides of the shaft and two such bell crank levers supported on the axles for rotation therewith, a respective actuating lever connected to each one of the axles for rotating the axles in opposite directions, and means for moving the actuating levers in unison. This provides a very good support of the stack of superposed pieces in the shaft. Furthermore, when the lowermost piece is discharged from the lower shaft end, the stack is securely held in the shaft by the second bell crank lever arms which extend essentially parallel to the longitudinal axis of the shaft. After the bell crank levers have been returned to their locking position, in which the one arm of the levers project into the inner cross section of the shaft, the stack can glide down until its lowermost piece is supported on the one arm of the levers. The two bell crank levers may be synchronously moved in a very simple manner without danger of jamming. Accordingly, the actuating levers may be toggle levers having one end thereof affixed to a respective one of the axles and a free end defining an elongated slot, the slots overlapping each other, and the means for moving the levers in unison comprises a pin movable in the direction of the shaft and engaging the elongated slots for interconnecting the toggle levers. This produces a very simple structure and control of the pivotal lever movements.

BRIEF DESCRIPTION OF THE DRAWING

The above and other objects, advantages and features of the present invention will become more apparent from the following detailed description of certain now preferred embodiments thereof, taken in conjunction with the accompanying, somewhat schematic drawing wherein.

DETAILED DESCRIPTION OF PREFERRED EMBODIMENTS

Figure 1:
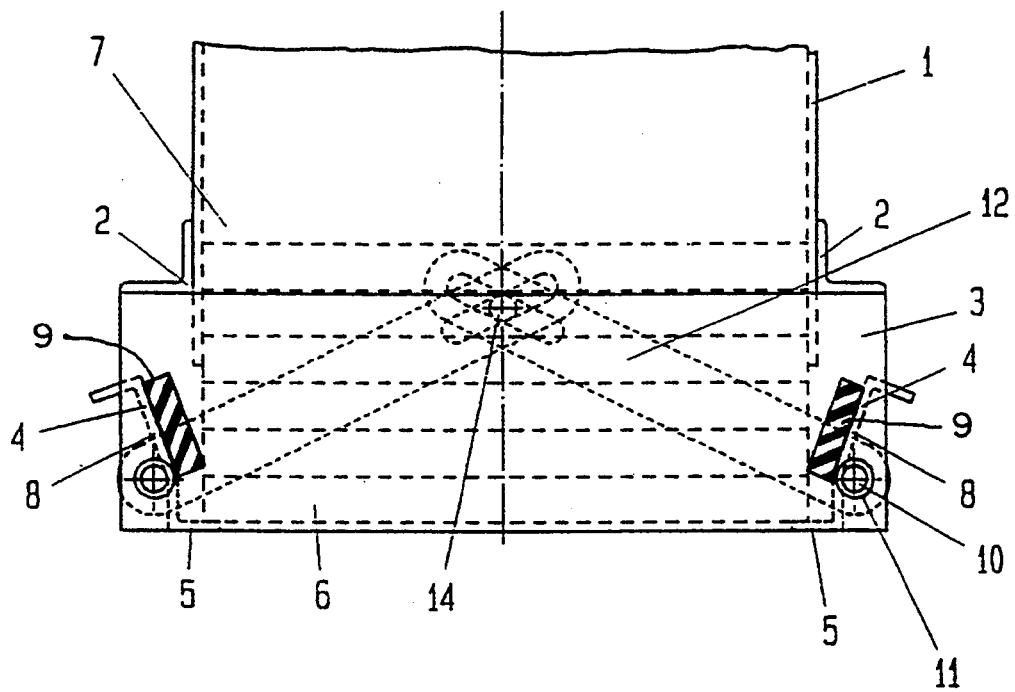
FIGS. 1 and 2 show a first embodiment of the discharge unit in side elevation, with the bell crank levers being respectively in their holding and release positions.

In the drawing, like reference numerals designate like parts in all figures, modified parts being indicated by primed numerals, to avoid redundancy in the description.

Figure 2:
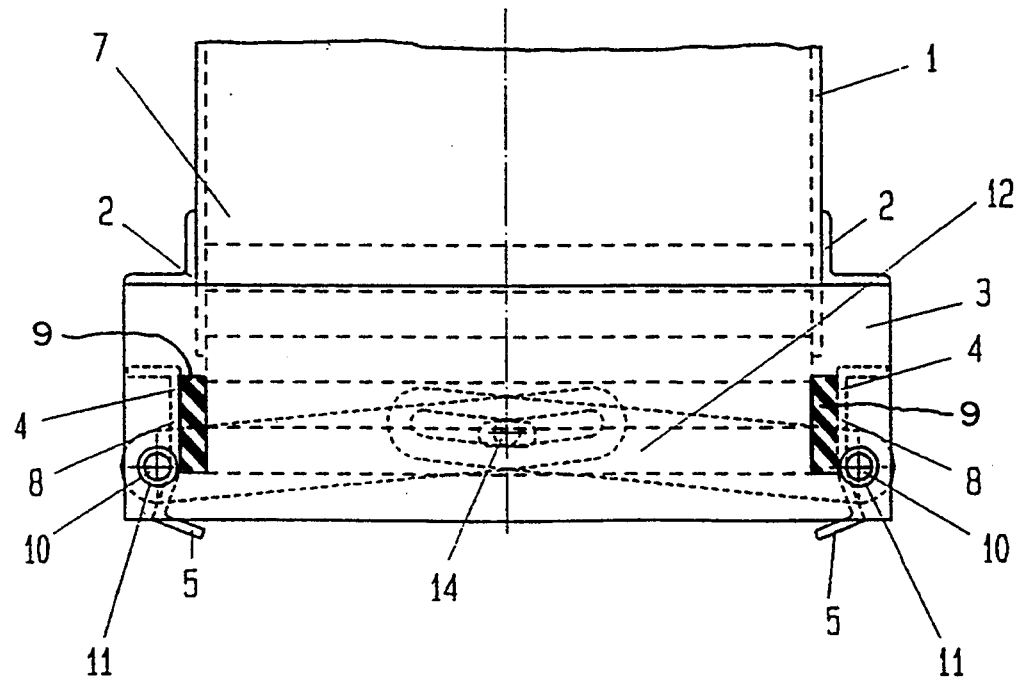

Referring first to FIGS. 1 and 2, there is shown a discharge unit for sequentially discharging a lowermost piece 6 of a stack 7 of such pieces superposed in shaft 1. As clearly illustrated, the pieces in the stack have a predetermined dimension and the shaft has walls defining an inner cross section corresponding to this dimension and a lower end wherefrom lowermost pieces 6 are sequentially discharged, the lower shaft end defining a plane. The pieces of the stack have side walls in contact with the shaft walls. In the illustrated embodiment, the lower shaft end has two carriers 3 extending parallel to each other and affixed to shaft 1 by angle brackets 2.

The discharge unit comprises two axles 10 extending in the plane of the shaft end parallel to each other at opposite sides of shaft 1 and two bell crank levers 4 supported on axles 10 for rotation therewith, and carriers 3 support bushings 11 in which the axles are rotatably journaled. Each bell crank lever 4 has a first arm 5 and a second arm 8, the bell crank lever being supported on the axle for pivoting between a first position (shown in FIGS. 1 and 3) wherein first arm 5 projects into the inner cross section of the shaft to hold lowermost piece 6 in shaft 1 and a second position (shown in FIGS. 2 and 4) wherein first arm 5 is retracted out of the inner shaft cross section to release lowermost piece 6 for discharge therefrom from the shaft. According to the invention, second bell crank lever arm 8 is arranged to contact a respective side wall of the piece of the stack superposed over lowermost piece 6 to clamp the superposed piece in position when first bell crank lever arm 5 is pivoted into the second position to hold stack 7 in shaft 1. In this clamping position, second bell crank lever arms 8 extend substantially parallel to the longitudinal axis of shaft 1 and the side walls of the lowermost piece 6.

According to the embodiments shown in FIGS. 1-4, a layer of an elastically deformable material 9 is mounted on second bell crank lever arm 8 and faces the superposed piece, first arm 5 being spaced from a lower edge of elastically deformable material 9 by a distance corresponding at least to the height or thickness of lowermost piece 6. Preferably the elastically deformable material has a great friction coefficient.

Figure 4:
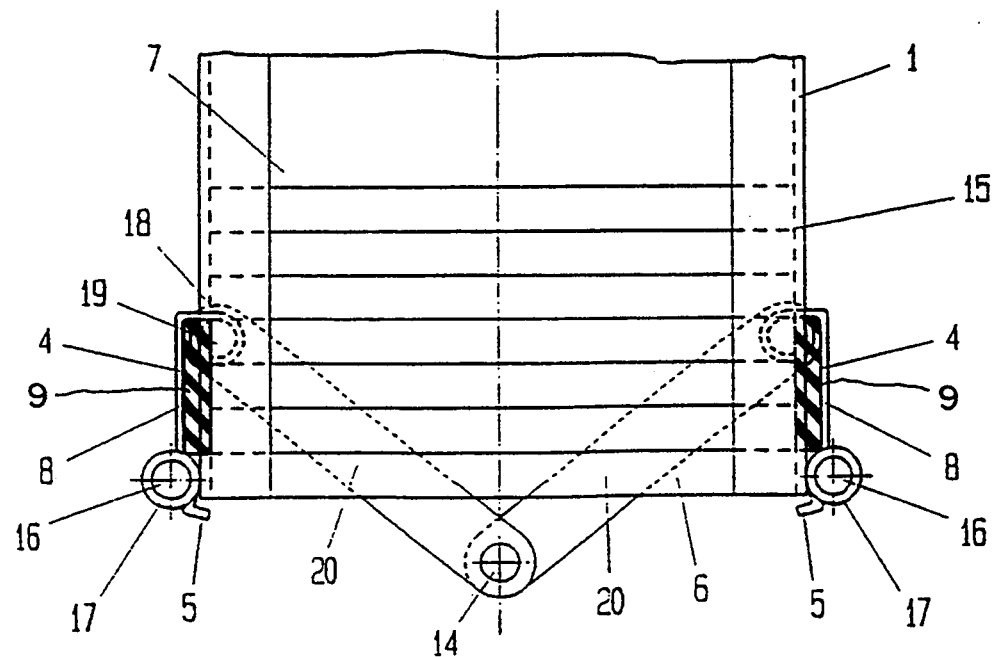

As can be seen in FIGS. 2 and 4, when bell crank levers 4 are in their release position for discharge of lowermost piece 6 from shaft 1, elastically deformable material layers 9 will be pressed against stack 7 and will hold it in shaft 1 while lowermost piece 6 falls out of the shaft by gravity and is thus discharged therefrom because arms 5 have been retracted from the inner cross section of the shaft.

In the embodiment of FIGS. 1 and 2, a respective actuating lever 12 is connected to each axle 10 for rotating the axles in opposite directions. The illustrated actuating levers are toggle levers having one end thereof affixed to respective one of the axles and a free end defining an elongated slot 13. The slots overlap each other, and pin 14 movable in the direction of shaft 1 engages the elongated slots for interconnecting toggle levers 12 and moving the same in unison. Suitable drive means (not shown) act upon pin 14. Such drive means may be, for example, a pressure fluid-operated cylinder-piston device. This reciprocating movement of the toggle levers in the direction of the longitudinal axis of shaft 1 will rotate axles 10 and pivot bell crank levers 4 affixed thereto between their locking position (FIG. 1) and their release position (FIG. 2).

Figure 3:
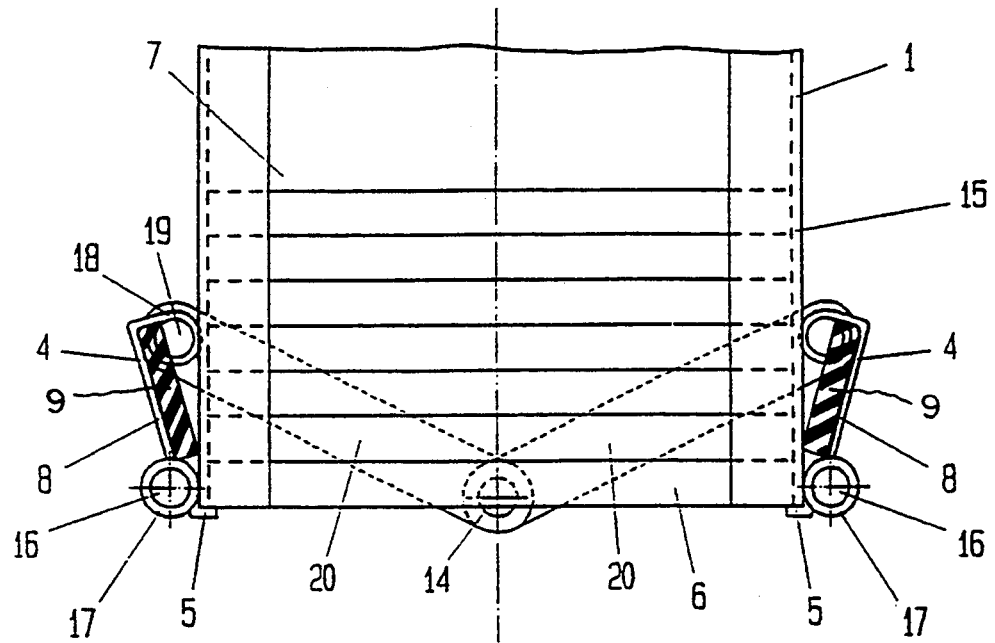
FIGS. 3 and 4 show a second embodiment of the discharge unit in side elevation, with the bell crank levers being respectively in their holding and release positions.

The embodiment illustrated in FIGS. 3 and 4 is structurally and functionally similar to that of FIGS. 1 and 2. In this embodiment, shaft 1' is constituted by two U-shaped sheet metal or like profiles 15 facing each other, with their two parallel legs extending towards each other and being connected by a web at the bottom of the U-shape. The connecting webs of profiles 15 have openings at the lower ends thereof to enable second arms 8' of bell crank levers 4' to be pivoted about supporting axles 16 into the position (shown in FIG. 4) wherein elastic material 9 engages stack 7. Bell crank levers 4' are affixed to collars 17 rotatably supported on axles 16.

Loops 18 are affixed to the free ends of bell crank lever arms 8' and receive pins 19 which link one end of toggle levers 20 to bell crank levers 4'. The other ends of the toggle levers are linked together by pivot pin 14 which, as in the previously described embodiment, are reciprocated by non-illustrated drive means in the direction of the longitudinal axis of shaft 1'. This unit operates in the same manner as that of FIGS. 1 and 2.

What is claimed is:

1. A discharge unit for sequentially discharging a lowermost piece of a stack of said pieces superposed in a shaft, the pieces in the stack having a predetermined dimension and the shaft having walls defining an inner cross section corresponding to said dimension and a lower end wherefrom the lowermost pieces are sequentially discharged, the lower shaft end defining a plane and the pieces having side walls in contact with the shaft walls, which discharge unit comprises two axles extending parallel to each other in said plane opposite sides of the shaft and two crank levers having a first arm and a second arm, the bell crank levers being supported on the axles for pivoting between a first position wherein the first arm projects into the inner cross section of the shaft to hold the lowermost piece in the shaft and a second position wherein the first arm is retracted out of the inner cross section of the shaft to release the lowermost piece for discharge from the shaft, and the second bell crank lever arm being arranged to extend substantially parallel to, and in contact with, a respective side wall of the piece of the stack superposed over the lowermost piece to clamp the superposed piece in position when the first bell crank lever arm is pivoted into the second position to hold the stack in the shaft.

2. The discharge unit of claim 1, further comprising an elastically deformable material mounted on the second bell crank lever arm and facing the superposed piece, the first arm being spaced from a lower edge of the elastically deformable material by a distance corresponding at least to the height of the lowermost piece.

3. The discharge unit of claim 1, comprising a respective actuating lever connected to each one of the axles for rotating the axles in opposite directions, and means for moving the actuating levers in unison.

4. The discharge unit of claim 3, wherein the actuating levers are toggle levers having one end thereof affixed to a respective one of the axles and a free end defining an elongated slot, the slots overlapping each other and the means for moving the actuating levers in unison comprising a pin movable parallel to the shaft and engaging the elongated slots for interconnecting the toggle levers.

* * * * *